（12) United States Patent
Kono et al.

(10) Patent No.: US 6,265,059 B1
(45) Date of Patent: Jul. 24, 2001

(54) POROUS FILM, PROCESS FOR THE PRODUCTION THEREOF AND RECORDING SUBJECT COMPRISING THE POROUS FILM

(75) Inventors: Katsuyuki Kono; Yuko Watanabe, both of Takatsuki (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/192,563

(22) Filed: Nov. 17, 1998

(51) Int. Cl.$^7$ ....................................................... B32B 5/22
(52) U.S. Cl. ..................................... 428/317.9; 428/313.5; 428/317.1; 523/218
(58) Field of Search .............................. 428/313.5, 317.1, 428/317.9; 523/218

(56) References Cited

U.S. PATENT DOCUMENTS 3,615,972 * 10/1971 Morehouse, Jr. et al. ............. 156/79

FOREIGN PATENT DOCUMENTS 9-156211   6/1997 (JP) .

* cited by examiner

Primary Examiner—Elizabeth M. Cole
Assistant Examiner—Ula C. Ruddock
(74) Attorney, Agent, or Firm—Oblon, Spivak, McClelland, Maier & Neustadt, P.C.

(57) ABSTRACT

The present invention provides a porous film obtained by coagulating polymer particles in an emulsion into the form of a film while maintaining their particle shape. The spaces between particles are left as pores, and as a result, the porous film has a plurality of thus-formed pores. By controlling the polymer particle diameter, the distribution of the particle diameter, and the solid concentration of the emulsion, the size of the pores of the film, the rate of pore area and the density of pores can be properly determined. The porous film is suitable for various applications including a recording subject for ink-jet printing, other recording subjects, films used in various industries, and the like.

16 Claims, 4 Drawing Sheets

POROUS FILM, PROCESS FOR THE PRODUCTION THEREOF AND RECORDING SUBJECT COMPRISING THE POROUS FILM

BACKGROUND OF THE INVENTION

1. Technical Field of the Invention

The present invention relates to a porous polymer film, a process for producing the same, and a method for using the same. Specifically, the present invention relates to a wholly new porous film which is obtained by coagulating polymer particles in an emulsion into the form of a film while substantially maintaining their particle shape and leaving the spaces between the particles as pores. The porous film of the present invention is usable for various applications, and is especially suitable for use in a recording material to be printed or recorded (hereinafter, referred to as a recording subject.). Therefore, the present invention will be described referring to the case where the porous film is used for a recording subject; however, it should be noted that the porous film of the present invention is applicable not only to a recording subject, but also to various applications.

2. Prior Art

In the ink-jet recording process, ink is sprayed in the form of droplet onto the surface of a recording subject to do printing thereon. The ink-jet recording method is widely used because of its advantages in that only low noise is produced, the printing speed is high, and clear multicolored-printing can be made. In recent years, as color printers come into wide use, ink-jet printers are increasingly popular to common people.

In the ink-jet printing method, water-based ink is mainly used because it attains high printing performance and is easy on the environment. However, when water-based ink for ink-jet printing is used to do printing on a film for over head projector (OHP), the water-based ink is repelled by the OHP film or spreads on the OHP film, and clear printing is not fixed. This is because an OHP film is made of polyethylene telephthalate (PET), and therefore, has low hydrophilic property.

In order to fix clear printing on an OHP film by an ink-jet printer, the following proposal has been made. A layer made of hydrophilic material is formed on the surface of the PET film so as to receive and fix water-based ink. For example, Japanese Laid-Open Patent Publication No. 57-14091 discloses an invention where a porous layer comprising a binding resin and filling particles such as organic particles and/or colloidal silica having an average particle diameter of 0.1 to 3 $\mu$m is formed. However, further studies conducted by the present inventors have revealed that it is difficult to determine the optimum blending ratio between the binding resin and the filling particles. In addition, the obtained porous layer has low transparency. When the amount of resin is excessive, water-based ink cannot be firmly fixed on the layer. Contrary to this, when the amount of resin is too small (that is, the amount of the filling particles is too large), the filling particles may peel off from the surface of the substrate, or the secondary coagulation of the filling particles may occur. As a result, the printed image has poor resolution.

Japanese Laid-Open Patent Publication No. 5-32414 discloses a recording sheet comprising a PET substrate and a porous layer formed thereon. The porous layer is made of pseudo-boehmite including a coagulate of boehmite crystals. The pseudo-boehmite has a particle thickness of 70 Å or larger in a direction vertical to (010) face, and a spacing between (020) faces of 6.17 Å or smaller. Ink is satisfactorily fixed on the sheet, and the recording sheet of this invention has been put on the market. However, this sheet has disadvantages in that fingerprint are easily left thereon, and the color of the sheet easily changes when it adsorbs gas. There are also problems that the sheet has a bad smell which derives from acetic acid used in its production, and that its transparency is relatively low.

The problem of low transparency may be solved by making pseudo-boehmite particle smaller. In this case, however, a fine inorganic particle has too high surface activity to the resultant sheet and coagulates easily. Therefore obtained small pseudo-boehmite particle is hard to handle, accordingly, this approach cannot be adopted. In addition, there is an opinion from general consumers that this sheet is too expensive (the price of this sheet is four or more times the price of standard OHP films).

As a low-priced OHP film for ink-jet printing, a film produced by coating a water-soluble polymer onto a PET substrate is placed on the market. However, this OHP film is poor in humidity resistance, because a water-soluble polymer layer is used as an ink-receiving layer. In order to overcome this disadvantage, this OHP film needs to be packed into a moisture-resistant package; otherwise, blocking may occur, and if moisture adheres to the OHP film after printing, the water-soluble polymer layer dissolves and peels off.

SUMMARY OF THE INVENTION

It is an object of the present invention to provide a porous film which, when used for a recording subject, allows the recording subject to form clear image with high reproducibility and color-developability, and which is easy to handle. The porous film is suitable for use in not only a recording subject but also in various applications.

According to an aspect of the present invention, a porous film is obtained by coagulating polymer particles in an emulsion into the form of a film, while maintaining their particle shape and leaving spaces between particles as a plurality of pores.

According to another aspect of the present invention, a method for producing a porous film includes the steps of: forming a layer comprising an emulsion containing an aqueous medium and polymer particles stably dispersed in the aqueous medium; destabilizing the layer to coagulate the polymer particles in the emulsion before water is completely evaporated from the layer; and drying the layer.

The porous film of the present invention can be used in various applications. The porous film is useful as an ink-receiving layer of a recording subject, and is especially suitable for use in a recording subject for ink-jet printing.

These and other objects, features and advantages of the invention will become more apparent upon reading the following detailed description.

DETAILED DESCRIPTION OF THE PREFERRED EMBODIMENT OF THE INVENTION

Figure 1A:
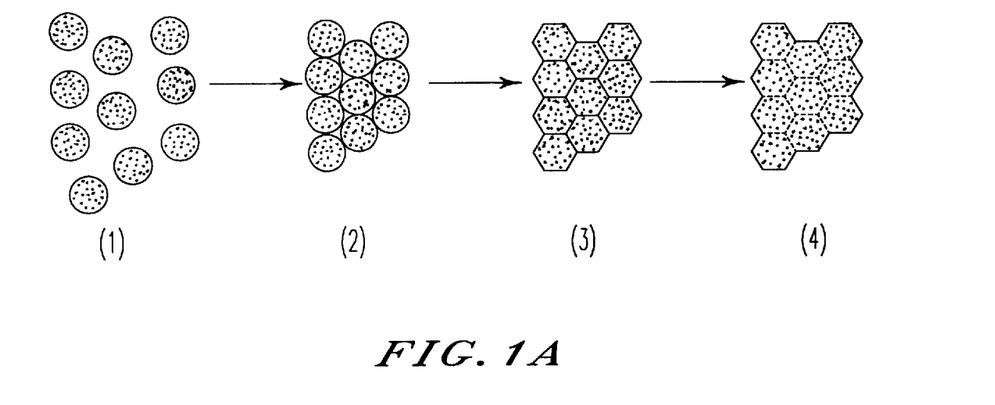
FIGS. 1A–1C are diagrams respectively illustrating the patterns of film-formation mechanism by use of an emulsion.
Figure 1B:
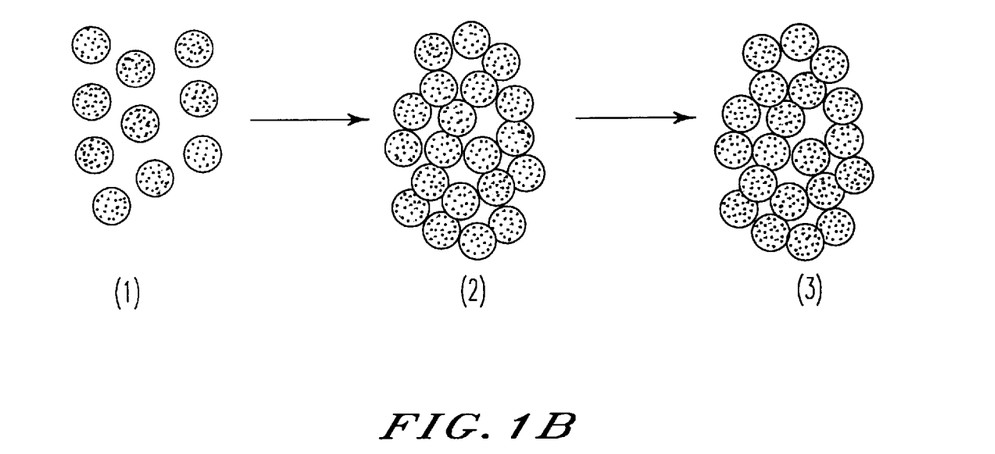
Figure 1C:
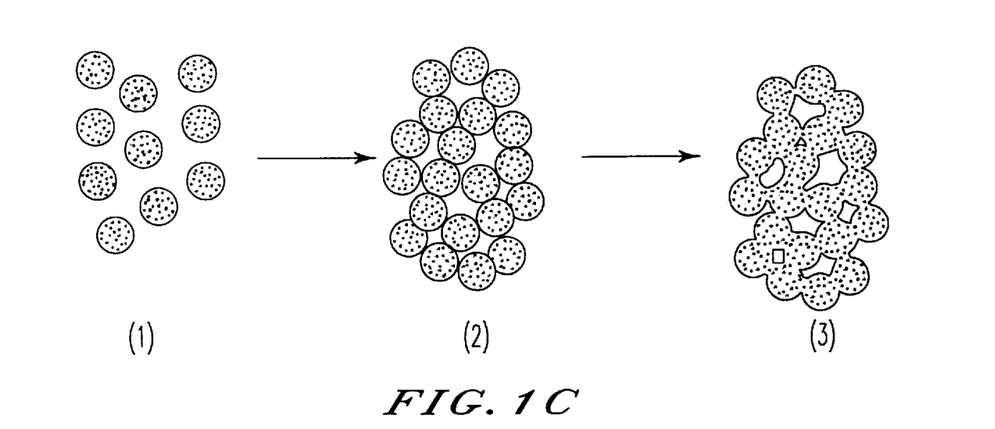

The porous film of the present invention is obtained by coagulating polymer particles in an emulsion into the form of a film while maintaining their particle shape and leaving the spaces between the particles as a plurality of pores. Hereinafter, difference between the process of forming the porous film of the present invention and a common process of forming a film formed by use of a common emulsion will be described referring to FIGS. 1A to 1C. FIG. 1A is a diagram illustrating a structure of the common film formed by use of an emulsion. FIGS. 1B and 1C are diagrams illustrating a structure of the porous film of the present invention.

The common film shown in FIG. 1A is formed by use of an emulsion by the following step.

(1) An emulsion is applied onto the surface of a substrate and is dried to form an emulsion layer. At the initial stage of the drying step, sufficient water is present in the emulsion layer, and polymer particles freely move with Brownian motion in the layer.

(2) As the drying step proceeds and the amount of water in the layer is decreased, the particles are drawn toward each other by the surface tension of the water. As a result, the particles are in a closely-packed state.

(3) The closely-packed particles are fused to bond to each other while changing their shapes by the capillary pressure of remaining water, by the movement and mutual diffusion of the polymer molecular chains (segments), or by the viscous flow of the polymer molecular chains.

(4) The particle boundaries disappear and a film having a continuous and uniform surface is formed.

The porous film shown in FIG. 1B of the present invention is formed by the following steps.

(1) The same as the above case shown in FIG. 1A.

(2) In a stage where sufficient water is still present in the emulsion layer, the emulsion is destabilized. In this manner, the polymer particles coagulate, and then bond to each other while maintaining their particle shape and leaving the spaces therebetween.

(3) Water is evaporated in the state where the polymer particles bond to each other while maintaining their particle shape and leaving the spaces therebetween as pores. In this manner, a porous film is formed.

The porous film shown in FIG. 1C of the present invention is formed by the following steps.

(1), (2) The same as the above case shown in FIG. 1B.

(3) In the step (2), the polymer particles bond to each other while maintaining their particle shape and leaving the spaces therebetween as pores. Although a part of particle is fused to bond to an adjacent particle in the heating and drying step, the modification and fusion of the particles are slight to the extent that the spaces between particles are left. As a result, a porous film is formed.

In the process shown in FIG. 1C, a part of particle is deformed, and is fused to bond to an adjacent particle. The resultant porous film has higher physical strength than the porous film obtained in the process shown in FIG. 1B in many cases. In order to form a porous film with high strength through the process shown in FIG. 1B, the polymer particles may be crosslinked to reinforce the bonding between particles.

As described above, according to the present invention, the polymer particles in the emulsion coagulate to each other while substantially maintaining their particle shape (hereinafter, the expression "while substantially maintaining their particle shape" is applicable to both the processes of FIGS. 1B and 1C) before water is evaporated from the emulsion layer. The particles bond to each other in the state where the spaces between the particles are left, and after that, the water is evaporated. Since the spaces between particles are left as pores of the film, the resultant film is a porous film having a plurality of pores.

In the present invention, in order to coagulate the polymer particles while substantially maintaining their particle shape, it is preferable to destabilize the emulsion. There is no limitation on a method for destabilizing the emulsion to coagulate the polymer particles, and a heat-sensitive gelation method and a photo-gelation method may be used. As the heat-sensitive gelation method, there are the following two methods. (1) A method in which the emulsion itself is destabilized by a change in the temperature. For example, the emulsion produced by using a nonionic emulsifier having a clouding point, conducts gelation by heating the emulsion to the clouding point or higher. (2) A method in which a heat-sensitive gelling agent is added to the emulsion. The emulsion is then heated to the gelation temperature of the heat-sensitive gelling agent or higher to conduct gelation. As the photo-gelation method, there is the following method. An emulsion produced by using a photodegradable emulsifier, is exposed to light to decompose the emulsifier, and as a result, the emulsifier loses its ability of stabilizing the polymer particles, thereby conducting gelation. In the present invention, there are the following methods for producing the emulsion: a method in which emulsion polymerization is conducted; and a method in which polymerization other than emulsion polymerization is conducted, and then, polymer particles are compulsively dispersed in an aqueous medium.

As described above, as the heat-sensitive gelation method, there are two methods: (1) the heat-sensitive gelation property is imparted to the emulsion itself; and (2) the heat-sensitive gelling agent is added to the emulsion.

In the case of employing the method (1), the emulsion polymerization is conducted using a nonionic emulsifier having a clouding point, or alternatively, a polymer is prepared first, and then is compulsively dispersed in an aqueous medium using the nonionic emulsifier (i.e. a dispersant), thereby obtaining the emulsion.

Examples of the nonionic emulsifier include polyvinyl alcohol, modified polyvinyl alcohol, polyethyleneglycol fatty acid ester, higher alcohol polyethyleneglycol ether, alkylphenol polyethyleneglycol ether, condensates of alkylamine and polyethylene glycol, condensates of alkylamide and polyethyleneglycol, condensates of sorbitan fatty acid monoester and polyethyleneglycol, and the like. Depending on which to use among them, the emulsifier has a clouding point of about 30 to 100° C. or higher, and the emulsifier having a clouding point of 98° C. or lower is preferable. The use of the emulsifier having a clouding point of 98° C. or lower makes it easy to control the evaporation of water from the emulsion layer in the course of gelation, thereby obtaining a porous film on which pores are uniformly formed. However, the emulsifier having a clouding point of about 100° C. or higher also may be used. In this case, the clouding point thereof can be lowered by adding a water-soluble compound.

In the case of employing the method (2), the followings may be used as the heat-sensitive gelling agent: silicofluorides such as sodium silicofluoride and potassium silicofluoride; metal complexes such as zinc ammonium sulfate complex, zinc ammonium carbonate complex, a salt of zinc oxide and inorganic or organic ammonium (i.e. a complex of them), nitroparaffin, organic esters, polyvinylmethylether, polypropyleneglycol, polyetherpolyformal, polyether modified polysiloxane, alkyleneoxide addition product of alkylphenol formalin condensates, functional polysiloxane, water-soluble modified silicone oil, silicone glycol copolymers, water-soluble polyamide, starch, methylcellulose, hydroxyethylcellulose, carboxymethylcellulose, protein, polyphosphoric acid, and above-described nonionic emulsifiers having the clouding point. These may be used alone or in combination of two or more of them. The combination of two or more of them is preferable, because the combination makes it easy to control the gelation temperature. For example, nitroparaffin and organic esters preferably are used in combination with zinc oxide. When the heat-sensitive gelling agent is used, the resultant porous film contains polymer particles and the gelling agent.

The preferable gelation temperature of the heat-sensitive gelling agent is 10 to 98° C. The gelation temperature of lower than 10° C. is not preferable, because good storage stability and pot life cannot be attained after the emulsion and the heat-sensitive gelling agent are mixed with each other. The gelation temperature of higher than 98° C. is not preferable as well, because the water is evaporated at a speed higher than the gelation speed. In this case, pores are not uniformly formed on the porous film. The expression "the heat-sensitive gelation" does not mean that the gelation never proceeds at normal temperature, but has a broad meaning that the gelation is greatly promoted at a temperature higher than the gelation temperature of the gelling agent.

In both cases of employing the heat-sensitive gelation method and the photo-gelation method, there is no specific limitation on the composition of the emulsion itself. Examples of the emulsion include: acrylic emulsions obtained by copolymerizing various other polymerizable monofunctional or multifunctional monomers using (meth) acrylic acid and the ester thereof as a main component; rubber latexes such as SBR, NBR, IR, NR and the like; polyester or polyurethane dispersed in water. In addition, the blend of two or more emulsions, and an emulsion including core-shell type particles also may be used. When the porous film of the present invention is intended for use in a recording subject, it is recommended to use an emulsion capable of forming a porous film which never loses porosity when stored at normal temperature. In other words, it is preferable to use an emulsion including a polymer having Tg of 0° C. or higher. An emulsion including a polymer having Tg of lower than 0° C. also may be used as far as the emulsion polymer is crosslinked in order that the mobility (i.e. the deformability) of the resultant porous film is suppressed.

The size of pores and the transparency of the film depend on the size of polymer particles in the emulsion. Preferably, the average particle diameter of the polymer particles is 10 μm or smaller. By use of the emulsion including polymer particles with an average particle diameter of 10 μm or smaller, the resultant porous film has a large number of minute pores with an average diameter of 500 nm or smaller, and the pores are formed uniformly over the porous film. The transparency of the porous film depends on, in addition to the particle diameter of the polymer particles, the refractive index thereof. In the present invention, organic polymer particles are used to form the porous film. As compared with inorganic particles, polymer particles have lower refractive index, therefore, the resultant porous film has high transparency, and there is no need to select a polymer of which particle diameter is extremely small.

Next, a method in which the emulsion is destabilized to coagulate the polymer particles will be described. Basically, an emulsion is applied onto the surface of a substrate to form a layer of the emulsion in a state that the layer still contains water. Then, in the case of employing the heat-sensitive gelation method, the resultant is heated to the heat-sensitive gelation temperature or higher. In the case of employing the photo-gelation method, the resultant is exposed to light. In both cases, the emulsion is destabilized before all the water in the emulsion layer is evaporated, thereby coagulating (i.e. gelling) the polymer particles while substantially maintaining their particle shape. The water is evaporated in the course of or after the gelation of the polymer particles.

In the heat-sensitive gelation method, in order to form a uniform porous film, it is preferable to evaporate the water from the emulsion layer at the gelation temperature of the emulsion or higher and at the water vapor pressure identical to or higher than the saturated water vapor pressure at the gelation temperature. At the gelation temperature or higher, the gelation and the coagulation of the polymer particles are promoted. At the water vapor pressure identical to or higher than the saturated water vapor pressure at the gelation temperature or higher, the evaporation of water from the emulsion layer is suppressed. The above-described temperature and the pressure are especially preferable in the cases where a coating of the emulsion is applied on the substrate to form a thin emulsion layer, where the emulsion contains large amount of solid content and small amount of water to be evaporated, and where the heat-sensitive gelling agent has high gelation temperature. This is because, in these cases, a problem may arise that the water is evaporated at a speed higher than the gelation speed and a uniform gelation cannot be attained. Therefore, it is preferable to conduct the gelation and the coagulation in the state where the evaporation of the water from the emulsion layer is suppressed at the above-described temperature and pressure. When the gelation and coagulation of the polymer particles are finished, the temperature and the pressure may be changed to such values as positively evaporating the water from the emulsion layer.

In the heat-sensitive gelation method, even if the water is evaporated from the emulsion layer in the course of the gelation, a uniform porous film can be obtained by using a heat-sensitive gelling agent having high gelation speed or low gelation temperature. In the photo-gelatin method, it is preferable that the water is vaporized from the emulsion layer after the polymer particles are coagulated by light irradiation at low temperature.

The emulsion preferably includes a solid content of 20 weight % or more. With a solid content of smaller than 20 weight % or smaller, the absolute number of the polymer particles in the emulsion becomes small, and the coagulation of the polymer particles is hard to occur. The resultant porous film is not uniform, and easily shrinks to be cracked in a dry condition. There is no upper limit of solid content, and the preferable upper limit is 70 weight %. With the content of larger than 70 weight %, there may be the cases where the porous film has only a small number of pores, or the size of pores is small. In addition, the emulsion with solid content of larger than 70 weight % has high viscosity. The workability of applying such an emulsion is low.

As described above, the porous film of the present invention is obtained by coagulating and gelling the polymer particles in the emulsion to form a film while maintaining their particle shape. The spaces between the particles having a substantially sphere shape are left as pores of the film. The porous film of the present invention is unique in this regard. Through the use of polymer particles of which particle diameter distribution curve is sharp, it is possible to form pores with a sharp diameter distribution curve. The size and density (i.e. the number of pores per unit volume) of the pores can be freely controlled by controlling the size and the concentration of the polymer particles in the emulsion. In addition, by properly determining the composition of the polymer, it is possible to design the porous film to suit intended applications.

The porous film of the present invention is excellent in uniformity of the pores and transparency of the film. Due to such characteristics, the porous film is useful as an ink-receiving layer of a recording subject, and thus obtained ink-receiving layer used the porous film, is excellent in water resistance, transparency, color-developability, and printing clearness. A recording subject for ink-jet printing formed with such an ink-receiving layer is easy to handle, and exhibits high performance, as compared with conventional ones. One of the examples of the recording subject is an OHP sheet including a polyethylenetelephthalate film as a substrate, and the porous film formed thereon (there may be a layer interposed therebetween). Another example thereof is a recording subject including a transparent substrate such as polystyrene, polyethylene, polypropylene, polysulfone, polycarbonate and the like, and the porous film formed thereon. As described above, the high transparency is one of the outstanding advantages of the porous film. Besides this, the porous film also exhibits excellent color-developability and fixing property when formed as an ink-receiving layer on a substrate such as opaque paper, synthetic paper and the like. Due to such characteristics, the porous film may be used for heat-sensitive transfer recording subjects, heat-sensitive recording papers and the like.

When the porous film is formed on the surface of products on which printing is hard to make as they are, for example, fiber products, plastic molded products, ceramics products such as china ware, printing can be made with high accuracy.

In order to forming the porous film on a substrate, the following methods may be employed: a method in which the emulsion is directly applied on the substrate to form the porous film thereon; and a method in which the porous film is formed on a base material other than the aimed substrate, and then is transferred to the aimed substrate. Between the substrate and the porous film, a primer layer or an adhesion layer may be formed in order that the porous film firmly adheres to the substrate. Such a primer layer and an adhesion layer may be properly selected in accordance with the materials of the substrate and the porous film. For the purpose of attaining high adhesion, it is preferable to use a polymer composition having Tg of 20° C. or lower.

The size of pores on the porous film is controllable by controlling the size of polymer particles in the emulsion. Therefore, on top of the recording subject, the porous film may be useful in various applications such as air filters, membranes intended for special use including filtration membranes, semipermeable membranes and membranes having selective permeability, buttery separators, and the like. In addition, the porous film is also obtainable by use of inorganic particles, instead of the organic polymer particles.

EXAMPLES

Hereinafter, the present invention will be further described in detail with reference to examples. However, it is to be noted that various changes and modifications will be apparent to those skilled in the art. Therefore, unless otherwise such change and modifications depart from the scope of the invention, they should be construed as being included therein. In the following examples, part and percentage mean parts by weight and weight percent respectively, unless otherwise described.

Example 1

Into a flask equipped with a dropping funnel, a stirrer, a nitrogen introduction pipe, a thermometer, and a reflux condenser, charged were 170 parts of ion exchanged water, 17 parts of Nonipole 200 (a polyethyleneglycol nonylphenylether-based emulsifier: a product of Sanyo Kasei Kogyo), and 2 parts of Newpole PE-64 (a polyethyleneglycol-polypropylene glycol block copolymer-based emulsifier: a product of Sanyo Kasei Kogyo). The mixture was heated to 45° C. while nitrogen was slowly introduced therein. Into the dropping funnel, charged was a monomer mixture of 292 parts of methyl methacrylate, 23 parts of butyl acrylate, and 135 parts of styrene, and 25% thereof was added dropwise into the flask.

Subsequently, into the flask, added were 15 parts of 1% aqueous solution of sodium hydrogen sulfite and 15 parts of 3% aqueous solution of ammonium persulfate. After 30 minutes, the remaining monomer mixture, 62 parts of 1% aqueous solution of sodium hydrogen sulfite, and 62 parts of 1% aqueous solution of ammonium persulfate were respectively added dropwise into the flask for 3 hours. In the course of dripping, the temperature inside the flask was kept at 50 to 54° C. When the dropping was finished, the resultant was mixed at the same temperature for 1 hour to complete polymerization. As a result, an aqueous resin dispersion (1) having a solid concentration of 52.0% and pH of 2.1 was obtained In the dispersion (1), polymer particles having an average particle diameter of 120 nm were dispersed.

To 100 parts of zinc sulfate, 108 parts of 25% ammonia water was added to prepare 48% aqueous solution of zinc ammonium sulfate complex. To 100 parts of the aqueous resin dispersion (1), 6 parts of thus-obtained 48% aqueous solution of the zinc ammonium sulfate complex was added. The mixture was sufficiently stirred to prepare an coating emulsion (1). On the other hand, onto the surface of a PET film as a substrate having a thickness of 100 μm, polyvinyl alcohol was applied to form a primer layer having a thickness of 3 μm. Onto thus-obtained substrate, the emulsion (1) was applied with a barcoater No. 20, and immediately after that, the resultant was placed into an environmental chamber in which the temperature was set to 80° C. and the humidity was set to 60%. In this state, the polymer particles in the emulsion layer were gelated and the emulsion layer was dried for 15 minutes. As a result, an OHP sheet (1) for ink-jet printing on which an ink-receiving layer having a thickness of 25 μm was formed was obtained.

Example 2

Into a flask equipped with a dropping funnel, a stirrer, a nitrogen introduction pipe, a thermometer, and a reflux condenser, charged was 322 parts of ion exchanged water. The ion exchanged water was heated to 80° C. while nitrogen was slowly introduced therein. On the other hand, a pre-emulsion was prepared by mixing and stirring 265 parts of methyl methacrylate, 117 parts of divinylbenzene, 8 parts of γ-methacryloxypropyltrimethoxysilane, 70 parts of 20% aqueous solution of the emulsifier represented by the following chemical formula, 175 parts of ion exchanged water, and 3 parts of 25% ammonia water:

(where the sum of a and b is 20 as an average of the emulsifier, and c is 1 or 2. The monomer units randomly bond with each other in a molecule of the emulsifier)

Into the flask, 2% of the pre-emulsion was added dropwise.

Subsequently, 20 parts of 5% aqueous solution of sodium persulfate was added to the flask. After 30 minutes, the dropping of the remaining pre-emulsion into the flask was started, and after 5 hours, the dropping was finished. In the course of dropping, the temperature inside the flask was kept at 78 to 82° C. After the dropping was finished, 20 parts of 2% potassium persulfate was further added to the flask, and the mixture was stirred at the same temperature for 1 hour to be polymerized. As a result, an aqueous resin dispersion (2) having a solid concentration of 40.4% and pH of 8.1 was obtained. In the dispersion (2), polymer particles having an average particle diameter of 176 nm were dispersed.

To 100 parts of the aqueous resin dispersion (2), added were 7.5 parts of 48% aqueous solution of zinc ammonium sulfate complex obtained by repeating the steps of Example 1 and 1 part of TPA-4380 (a polyether modified silicone-based heat-sensitive gelling agent: a product of Toshiba Silicone Co., Ltd.). The mixture was sufficiently stirred to obtain a coating emulsion (2). The emulsion (2) was applied, gelated, and dried by repeating the steps of Example 1, except that a barcoater No. 26 was used. As a result, an OHP sheet (2) on which an ink-receiving layer having a thickness of 25 μm was formed was obtained.

Example 3

Into a flask equipped with a dropping funnel, a stirrer, a nitrogen introduction pipe, a thermometer, and a reflux condenser, charged were 183 parts of ion exchanged water and 1 part of Aquarone HS-10 (a reactive emulsifier: a product of Dauichi Kogyo Seiyaku Co., Ltd.). The mixture was heated to 70° C. while nitrogen was slowly introduced therein. On the other hand, a pre-emulsion was prepared by mixing and stirring 298 parts of methyl methacrylate, 141 parts of 2-ethylhexyl acrylate, 50 parts of styrene, 6 parts of acrylic acid, 5 parts of glycidyl methacrylate, 7 parts of Aquarone HS-10, and 194 parts of ion exchanged water. Into the flask, 5% of the pre-emulsion was added dropwise.

Subsequently, 20 parts of 1% aqueous solution of sodium hydrogen sulfite and 20 parts of 3% potassium persulfate were added to the flask. After 15 minutes, the remaining pre-emulsion, 37 parts of 1% aqueous solution of sodium hydrogen sulfite, 37 parts of 3% aqueous solution of potassium persulfate were respectively added dropwise into the flask for 3 hours. In the course of dropping, the temperature inside the flask was kept at 68 to 72° C. After the dropping was finished, the resultant was stirred at the same temperature for 1 hour to be polymerized. As a result, an aqueous resin dispersion (3) having a solid concentration of 50.9% and pH of 1.7 was obtained. In the dispersion (3), polymer particles having an average particle diameter of 118 nm were dispersed.

To 46 parts of zinc sulfate, 49 parts of ammonium hydrogen carbonate, and 116 parts of 25% ammonia water were added to prepare 45% aqueous solution of zinc ammonium carbonate complex. To 100 parts of the aqueous resin dispersion (3), 10 parts of thus-obtained 45% aqueous solution of the zinc ammonium carbonate complex was added. The mixture was sufficiently stirred to prepare a coating emulsion (3). On the other hand, onto the surface of a PET film as a substrate having a thickness of 100 μm, polyvinyl alcohol was applied to form a primer layer having a thickness of 3 μm. Onto thus-obtained substrate, the emulsion (3) was applied with a barcoater No. 20, and immediately after that, the resultant was placed into an environmental chamber in which the temperature was set to 80° C. and the humidity was set to 96%. In this state, the polymer particles in the emulsion layer were gelated and the emulsion layer was dried for 1 minute. As a result, an OHP sheet (3) for ink-jet printing on which an ink-receiving layer having a thickness of 25 μm was formed was obtained.

Example 4

Into a flask equipped with a dropping funnel, a stirrer, a nitrogen introduction pipe, a thermometer, and a reflux condenser, 275 parts of ion exchanged water was charged. The ion exchanged water was heated to 70° C. while nitrogen was slowly introduced therein. On the other hand, a pre-emulsion was prepared by mixing and stirring 315 parts of butyl acrylate, 135 parts of divinyl benzene, 27 parts of Nonipole 200 (a polyethylene glycol nonylphenyl ether-based emulsifier: a product of Sanyo Kasei Kogyo), 16 parts of Hitenol N-08 which is an anionic emulsifier (a polyethylene glycol alkylphenyl ether ammonium sulfate: a product of Daiichi Kogyo Seiyaku Co., Ltd.), and 214 parts of ion exchanged water. Into the flask, 5% of the pre-emulsion was added dropwise.

Subsequently, 5 parts of 5% aqueous solution of 2,2'-azobis(2-amidinopropane) dihydrochloride was added to the flask. After 20 minutes, the remaining pre-emulsion was added dropwise to the flask for 3 hours. In the course of dropping, the temperature inside the flask was kept at 68 to 72° C. After the dropping was finished, the resultant was stirred at the same temperature for 1 hour to be polymerized. As a result, an aqueous resin dispersion (4) having a solid concentration of 49.8% and pH of 1.8 was obtained. In the dispersion (4), polymer particles having an average particle diameter of 132 nm were dispersed.

To the aqueous resin dispersion (4), added was 10 parts of 48% aqueous solution of zinc ammonium sulfate complex prepared by repeating the steps of Example 1. The mixture was sufficiently stirred to prepare a coating emulsion (4). The emulsion (4) was applied on a substrate by repeating the steps of Example 1, and as a result, an OHP sheet (4) on which an ink-receiving layer having a thickness of 25 μm was obtained.

Example 5

Into a flask equipped with a dropping funnel, a stirrer, a nitrogen introduction pipe, a thermometer, and a reflux condenser, charged were 223 parts of ion exchanged water, 80 parts of 20% aqueous solution of the emulsifier of the same type as that used in Example 2, and 3 parts of 25% ammonia water. The mixture was heated to 80° C. while nitrogen was slowly introduced therein. On the other hand, a pre-emulsion was prepared by mixing and stirring 324 parts of methyl methacrylate, 36 parts of divinylbenzene, 36 parts of 20% aqueous solution of the emulsifier of the same type as that used in Example 2, 2 parts of 25% ammonia water, and 142 parts of ion exchanged water. Into the flask, 15% of the pre-emulsion was added dropwise.

Subsequently, 10 parts of 1% aqueous solution of acid sodium hydrogen sulfate and 24 parts of 5% potassium persulfate were added to the flask. After 30 minutes, the dropping of the remaining pre-emulsion into the flask was started, and the dropping was finished after 4 hours. In the course of dropping, the temperature inside the flask was kept at 78 to 82° C. When 2 hours elapsed since the initiation of the dropping, 20 parts of 2% aqueous solution of potassium persulfate was further added to the flask. After the dropping was finished, 20 parts of 2% aqueous solution of potassium persulfate was added to the flask, and the resultant was stirred for 3 hours.

Then, another pre-emulsion was prepared by mixing and stirring 30 parts of ethyl acrylate, 8 parts of N-vinylpyrroridone, 2 parts of grycidyl methacrylate, 4 parts of 20% aqueous solution of the emulsifier of the same type as that used in Example 2, and 16 parts of ion exchanged water. The pre-emulsion was added dropwise in the flask for 30 minutes. In the course of dropping, the temperature inside the flask was kept at 68 to 72° C. After the dropping was finished, 20 parts of 2% aqueous solution of potassium persulfate was added to the flask. The resultant was stirred at the same temperature for 1 hour to be polymerized. As a result, an aqueous resin dispersion (5) having a solid concentration of 42.3% and pH of 8.0 was obtained. In the dispersion (5) polymer particles having an average particle diameter of 50 nm were dispersed.

To 100 parts of the aqueous resin dispersion (5), added was 3 parts of TPA-4390 (a polyether modified silicone-based heat-sensitive gelling agent: a product of Toshiba Silicone Co., Ltd.). The mixture was sufficiently stirred, thereby preparing a coating emulsion (5). The emulsion (5) was applied on a substrate by repeating the steps of Example 2, and as a result, an OHP sheet (5) on which an ink-receiving layer having a thickness of 25, μm was formed was obtained.

Example 6

Into a flask equipped with a dropping funnel, a stirrer, a nitrogen introduction pipe, a thermometer, and a reflux condenser, charged were 183 parts of ion exchanged water and 1 part of Aquaron HS-10. The mixture was heated to 70° C. while nitrogen was slowly introduced therein. On the other hand, a pre-emulsion was prepared by mixing and stirring 155 parts of methyl methacrylate, 284 parts of 2-ethylhexyl acrylate, 50 parts of styrene, 6 parts of acrylic acid, 5 parts of grycidyl methacrylate, 7 parts of Aquaron HS-10, and 194 parts of ion exchanged water. Into the flask, 5% of the pre-emulsion was added dropwise.

Subsequently, into the flask, added were 20 parts of 1% aqueous solution of sodium hydrogen sulfate and 20 parts of 3% aqueous solution of potassium persulfate. After 15 minutes, the remaining pre-emulsion, 37 parts of 1% aqueous solution of sodium hydrogen sulfate, and 37 parts of 3% aqueous solution of potassium persulfate were added dropwise into the flask for 3 hours. In the course of dropping, the temperature inside the flask was kept at 68 to 72° C. After the dropping was finished, the resultant was stirred at the same temperature for 1 hour to be polymerized. As a result, an aqueous resin dispersion (6) having a solid concentration of 50.6% and pH of 1.8 was obtained. In the dispersion (6), polymer particles having an average particle diameter of 128 nm were dispersed.

To the aqueous resin dispersion (6), added were 90 parts of the aqueous resin dispersion (2) obtained in Example 2, 1 part of TPA-4380 (a polyether modified silicone-based heat-sensitive gelling agent: a product of Toshiba Silicone Co., Ltd.), and 5 parts of 48% aqueous solution of zinc ammonium sulfate complex obtained by repeating the steps of Example 1. The mixture was sufficiently stirred, thereby preparing a coating emulsion (6). On the other hand, onto a PET film as a substrate having a thickness of 100 μm, polyvinyl alcohol was applied to form a primer layer having a thickness of 3 μm. On thus-obtained substrate, the emulsion (6) was applied with a barcoater No. 24. Immediately after that, the resultant was put into an environmental chamber in which the temperature was set to 80° C. and the humidity was set to 96%. In this state, the polymer particles in the emulsion layer were gelated and the emulsion layer was dried for 1 minute. As a result, an OHP sheet (6) for ink-jet printing on which an ink-receiving layer having a thickness of 25 μm was formed was obtained.

Example 7

To 87 parts of the aqueous resin dispersion (1) obtained in Example 1, 13 parts of 2,2,4-trimethyl-1,3-pentanediolmonoisobutylate was added, and the mixture was sufficiently stirred. As a result, a coating aqueous resin dispersion (7) was obtained. To the dispersion (7), 5 parts of 48% aqueous solution of zinc ammonium sulfate complex obtained by repeating the steps of Example 1 was added and sufficiently stirred. As a result, a coating emulsion (7) was prepared. On the other hand, onto a PET film as a substrate having a thickness of 100 μm, polyvinyl alcohol was applied to form a primer layer having a thickness of 3 μm. On thus-obtained substrate, the emulsion was applied with a barcoater No. 26. Immediately after that, the resultant was put into an environmental chamber in which the temperature was set to 80° C. and the humidity was set to 96%. In this state, the polymer particles in the emulsion layer were gelated and the emulsion layer was dried for 1 minute. As a result, an OHP sheet (7) for ink-jet printing on which an ink-receiving layer having a thickness of 25 μm was formed was obtained.

Comparative Example 1

The aqueous resin dispersion (3) obtained in Example 3 was directly used as a coating emulsion (8). On the other hand, onto a PET film as a substrate having a thickness of 100 μm, polyvinyl alcohol was applied to form a primer layer having a thickness of 3 μm. On thus-obtained substrate, the emulsion (8) was applied with a barcoater No. 30. Immediately after that, the resultant was put into a drying oven in which the temperature was set to 80° C., and was heat-dried for 1 minute. As a result, an OHP sheet (8) for comparison on which an ink-receiving layer having a thickness of 25 μm was formed was obtained.

Comparative Example 2

On the surface of PET film having a thickness of 100 μm, 10% aqueous solution of PVA-CST (polyvinyl alcohol, produced by Kuraray Co., Ltd.) was applied to form a layer thereon. The resultant was put into a drying oven in which the temperature was set to 80° C., and was heat-dried for 15 minutes. As a result, an OHP sheet (9) for comparison on which a PVA-based ink-receiving layer was formed.

Comparative Example 3

To 100 parts of Snowtex (colloidal silica having a particle diameter of 20 to 40 nm, a product of Nissan Kagaku Co., Ltd.), added were 20 parts of 10% aqueous solution of the same type of PVA-CST as used in Comparative Example 2. The mixture was sufficiently stirred, and then, was applied on the surface of a PET film having a thickness of 100 μm to form a film having a thickness of 25 μm. The resultant was put into a drying oven in which the temperature was set to 80° C., and was heat-dried for 15 minutes. As a result, an OHP sheet (10) for comparison on which a PVA-based ink-receiving layer was formed was obtained.

Reference Example 1

To 100 parts of the aqueous resin dispersion (6) obtained in Example 6, added was 10 parts of 45% aqueous solution of zinc ammonium carbonate complex prepared by repeating the steps of Example 3. The mixture was sufficiently stirred, thereby preparing a coating emulsion 11). On the other hand, onto a PET film as a substrate having a thickness of 100 μm, polyvinyl alcohol was applied to form a primer layer having a thickness of 3 μm. On the surface of the substrate, the emulsion (11) was applied with a barcoater No. 28. Immediately after that, the resultant was put into an environmental chamber in which the temperature was set to 80° C. and the humidity was set to 96%. In this state, the polymer particles in the emulsion layer were gelated and the emulsion layer was dried for 1 minute, and then was heat-dried at 80° C. for 1 minute in a drying oven. As a result, an OHP sheet (11) on which an ink-receiving layer having a thickness of 25 μm was formed was obtained.

Property Evaluation Method

Onto the respective OHP sheets (1) to (11) obtained in Examples 1 to 7, Comparative Examples 1 to 3, and Reference Example 1, a color pattern was printed by use of an ink-jet printer MJ-5000C manufactured by Epson Co., Ltd. As to the respective OHP sheets, the ink drying property, the color-developability, the dot reproducibility, the water resistance, the transparency, and the surface state were evaluated by the following methods. The evaluation results are shown in Table 1.

[Ink Drying Property]

Immediately after the color pattern was printed, a piece of copy paper was put on the OHP sheet. The printed color pattern was sufficiently rubbed with fingers over the copy paper. The copy paper was visually observed to see to which extent the color pattern was transferred thereto. The evaluation was conducted under the following standards.

◯: The color pattern was not transferred.

Δ: The color pattern was slightly transferred.

X: The color pattern was considerably transferred.

[Color-developability]

A color pattern printed on paper exclusively used for ink-jet printing was used as a standard. On the other hand, a color pattern was printed on the respective OHP sheets. The printed color pattern on the OHP sheet was directly observed (in Table 1, simply referred to as "direct image"), and then, was projected on a screen by an OHP projector to observe the projected pattern (in Table 1, simply referred to as "projected image"). The color of the pattern recognized through the direct visual observation and the color of the projected pattern were respectively compared with the standard color pattern, and were evaluated under the following standards.

◯: The pattern is developed with high color-developability

Δ: The pattern is developed into a color slightly different from the standard color pattern.

X: The pattern is developed with poor color-developability.

[Dot Reproducibility]

A pattern was printed on the OHP sheet, and was observed upon being magnified with a magnifier. The shape of dots of the pattern was evaluated under the following standards.

◯: The shape of the dots is substantially round.

Δ: The shape of the dots is slightly deformed.

X: The shape of the dots is considerably deformed.

[Water Resistance]

Some droplets of water were dropped on the OHP sheet on which a pattern was printed. Then, the surface of the OHP sheet was rubbed with fingers 10 times, and then, the state of the ink-receiving layer was observed and evaluated under the following standards.

◯: No change was observed.

Δ: The ink-receiving layer was slightly dissolved.

x: The ink-receiving layer was entirely dissolved.

[Transparency]

The image of the OHP sheet was projected on a screen, and was evaluated whether or not the sheet was transparent enough to be used as an OHP sheet under the following standards.

◯: No problem in transparency

Δ: The projected image was slightly yellowish.

x: The projected image was considerably dark.

[Surface State]

Figure 2:
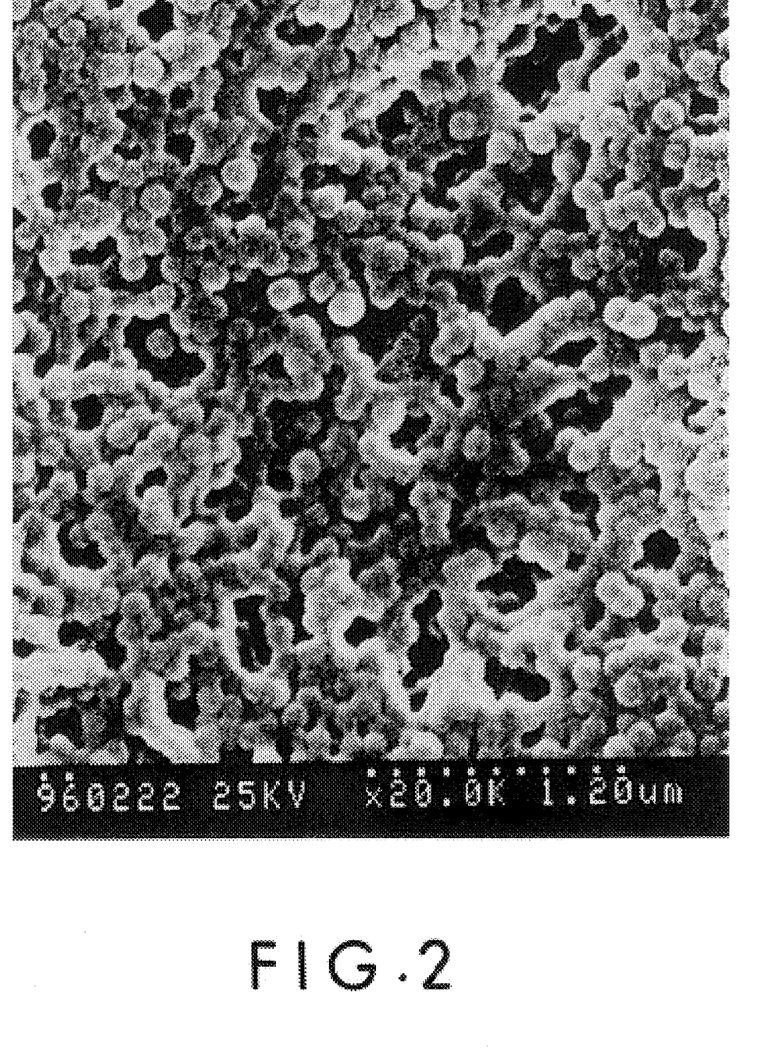
FIG. 2 is an SEM photograph showing a particle structure of the ink-receiving layer of the OHP sheet obtained in Example 1 of the present invention.
Figure 3:
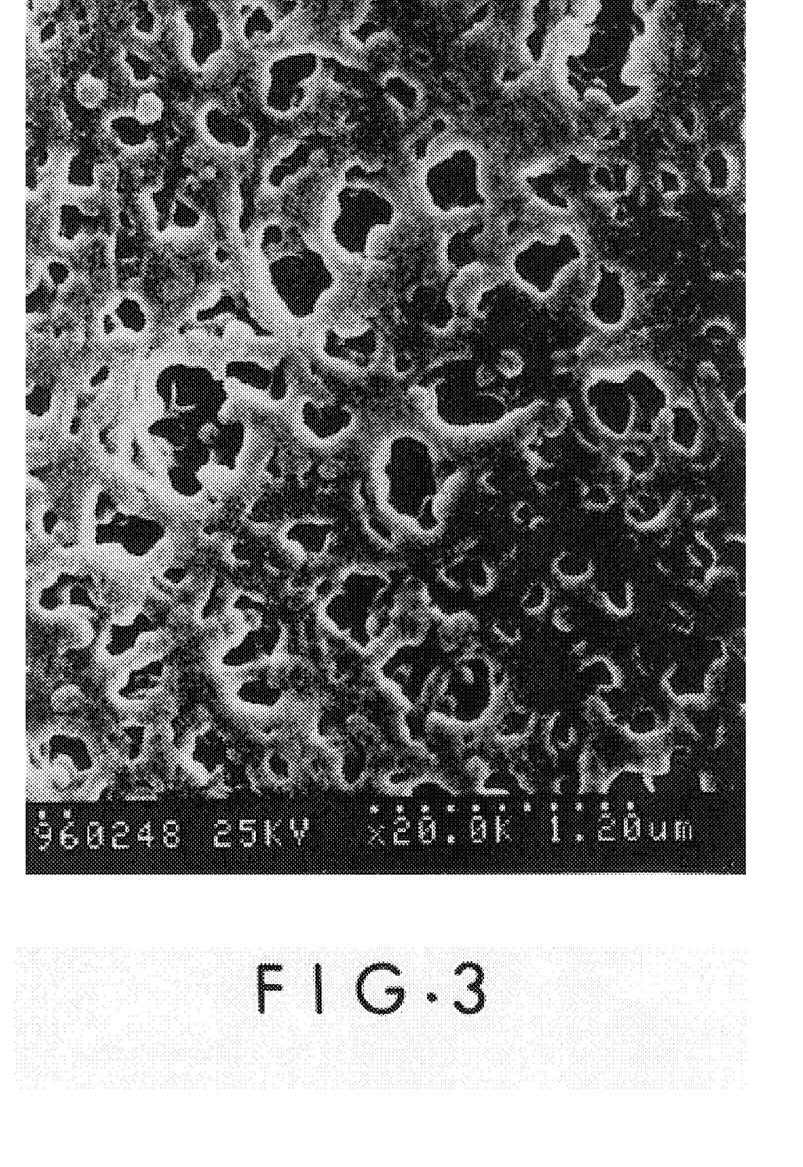
FIG. 3 is an SEM photograph showing a particle structure of the ink-receiving layer of the OHP sheet obtained in Example 3 of the present invention.
Figure 4:
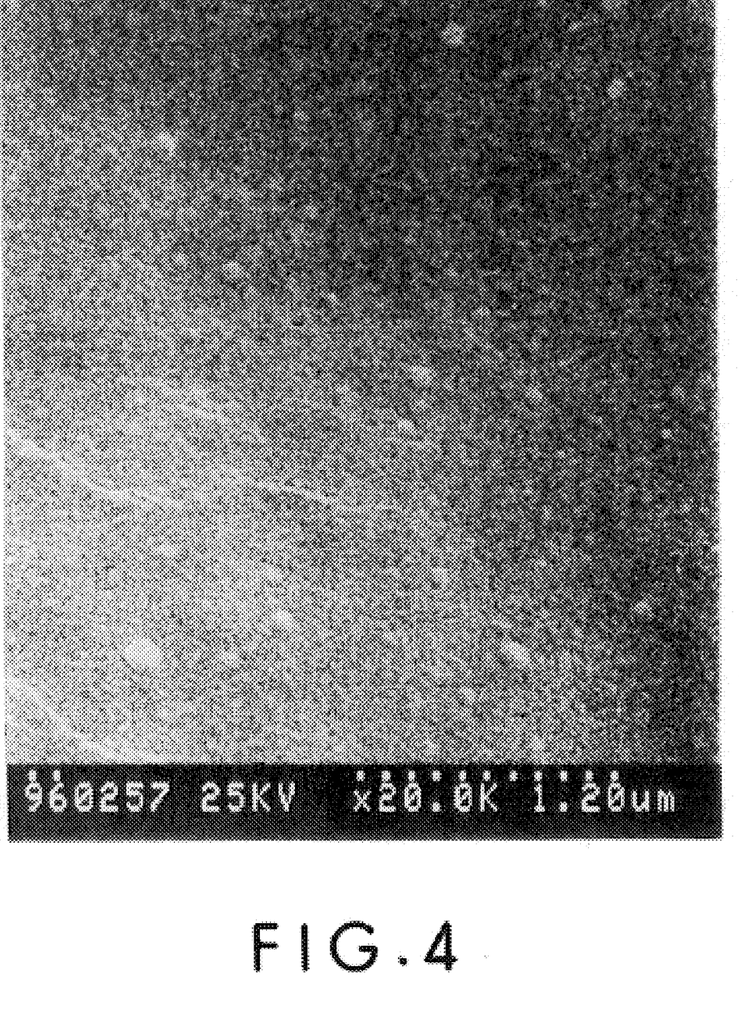
FIG. 4 is an SEM photograph showing a structure of the ink-receiving layer of the OHP sheet obtained in Comparative Example 1 of the present invention.

The surface of the OHP sheet was magnified into 20,000 times with a scanning electron microscope (SEM) to see the state of pores formed thereon. The states of particles obtained in Examples 1 and 3 and Comparative Example 1, which were fused to bond to each other, are shown in the SEM photographs of FIGS. 2 to 4, respectively. In Example 1, the porous film had the structure similar to the pattern shown in FIG. 1B. In Example 3, the porous film had the structure similar to the pattern shown in FIG. 1C. In Comparative Example 1, the porous film had the uniform structure similar to the pattern shown in FIG. 1A.

TABLE 1

| OHP sheet No. | Drying property | Color-developability Direct image | Color-developability Projected image | Dot reproducibility | Water resistance | Transparency | Surface state | Remarks |
|---|---|---|---|---|---|---|---|---|
| Ex. | | | | | | | | |
| (1) | ◯ | ◯ | ◯ | ◯ | ◯ | ◯ | Porous | Calculated Tg: 90° C. |
| (2) | ◯ | ◯ | Δ | ◯ | ◯ | ◯–Δ | Porous | High Tg Crosslinked by monomer |
| (3) | ◯ | ◯ | ◯ | ◯ | ◯ | ◯ | Porous | Calculated Tg: 30° C. |

TABLE 1-continued

| OHP sheet No. | Drying property | Color-developability | | | Water resistance | Transparency | Surface state | Remarks |
|---|---|---|---|---|---|---|---|---|
| | | Direct image | Projected image | Dot reproducibility | | | | |
| (4) | ○ | ○ | Δ | ○ | ○ | ○–Δ | Porous | Low Tg Crosslinked by monomer |
| (5) | ○ | ○ | ○ | ○ | ○ | ○ | Porous | Core-shell type |
| (6) | ○ | ○ | ○ | ○ | ○ | ○–Δ | Porous | Two kinds of dispersions are blended |
| (7) | ○ | ○ | ○ | ○ | ○ | ○ | Porous | Film-formation assisting agent is used |
| Comp. Ex. | | | | | | | | |
| (8) | x | Δ | x | x | Δ | ○ | No pore | Dried by conventional drying process |
| (9) | Δ | ○ | ○ | ○–Δ | x | ○ | No pore | PVA |
| (10) | ○ | x | x | ○ | x | x | Porous | Silica particles + PVA |
| Ref. | | | | | | | | |
| (11) | x | Δ | x | x | Δ | ○ | Less pore | Calculated Tg: −20° C. |

Remarks: Ex.: Examples; Comp.: Comparative Examples; and Ref.: Reference Example

What is claimed is:

1. A film obtained by coagulating polymer particles in an emulsion into the form of a film, while maintaining their particle shape and leaving spaces between the particles as a plurality of pores, wherein the film is porous.

2. The film according to claim 1, wherein the polymer particles are coagulated by destabilizing the emulsion.

3. The film according to claim 1, comprising polymer particles and a gelling agent.

4. The film according to claim 3, wherein the gelling agent is a heat-sensitive gelling agent which destabilizes the emulsion through the application of heat.

5. The film according to claim 1, wherein an average particle diameter of the polymer particles is 10 μm or smaller.

6. The film according to claim 1, comprising a plurality of pores having an average diameter of 500 nm or smaller.

7. The film according to claim 1, wherein the film is formed on a substrate.

8. The film according to claim 7, wherein a primer layer is formed on the substrate, and the film is formed on the primer layer.

9. A recording subject comprising the film of claim 1 as an ink-receiving layer.

10. The recording subject according to claim 9, further comprising an ink-jet printing ink in the ink-receiving layer.

11. The film according to claim 1, wherein the film has an ink-fixing property.

12. The film according to claim 1, wherein the particle shape is substantially spherical.

13. The film according to claim 1, wherein the polymer particles are solid.

14. A film consisting of substantially spherical polymer particles, wherein the particles are arranged so as to form pores between the particles, and the film is porous.

15. A method for producing a porous film, the method comprising
forming a layer of emulsion comprising an aqueous medium and polymer particles dispersed in the aqueous medium;
destabilizing the emulsion layer to coagulate the polymer particles before water is completely evaporated from the emulsion layer;
drying the emulsion layer; and
forming the film of claim 1.

16. The method according to claim 15, wherein the polymer particles in the emulsion are coagulated at a gelation temperature of the emulsion or higher, and at a water vapor pressure identical to or higher than a saturated water vapor pressure at the gelation temperature.

* * * * *